United States Patent [19]

Miida et al.

[11] Patent Number: 5,359,383
[45] Date of Patent: Oct. 25, 1994

[54] AUTOMATIC FOCUSING SYSTEM WITH PHASE DIFFERENCE DETECTING UNIT EMPLOYING CORRELATION OPERATING CIRCUIT

[75] Inventors: Takashi Miida; Hiroshi Iwabuchi; Yoshimitsu Kudoh; Hideki Mutoh, all of Kanagawa, Japan

[73] Assignee: Fuji Photo Film Co., Ltd., Kanagawa, Japan

[21] Appl. No.: 706,539

[22] Filed: May 28, 1991

[30] Foreign Application Priority Data

May 30, 1990 [JP] Japan .................................. 2-138549

[51] Int. Cl.⁵ .............................................. G03B 13/36
[52] U.S. Cl. ................................. 354/402; 250/201.2
[58] Field of Search ............... 354/402, 406, 407, 408; 250/201.2, 201.7, 201.8

[56] References Cited

U.S. PATENT DOCUMENTS

| | | | |
|---|---|---|---|
| 4,926,205 | 5/1990 | Miida et al. | 354/402 |
| 4,945,377 | 7/1990 | Miida et al. | 354/402 |
| 5,068,738 | 11/1991 | Miida | 354/408 |

FOREIGN PATENT DOCUMENTS

| | | |
|---|---|---|
| 0259887 | 3/1988 | European Pat. Off. . |
| 0298486 | 1/1989 | European Pat. Off. . |
| 0298725 | 1/1989 | European Pat. Off. . |

*Primary Examiner*—W. B. Perkey
*Attorney, Agent, or Firm*—Sughrue, Mion, Zinn, Macpeak & Seas

[57] ABSTRACT

A phase difference detection unit for an automatic focusing system of a camera or the like. The phase difference detecting unit includes a pair of linear image pickup devices which receive a pair of optical images of an object formed by the lens in the automatic focusing system of a camera or the like. The detecting unit also has a correlation operating circuit which determines whether or not the lens of the focusing system is in a proper focus condition. The proper focus condition is determined by a minimum correlation value output by the correlation operating circuit, the value being indicative of the correlation between a pair of phase shifted analog electrical signals representative of the optical images received by the pickup devices. The correlation operating circuit is capable of operation at high speed with improved accuracy by maintaining the capacitive loads of the input terminals of the correlation operating circuit.

14 Claims, 6 Drawing Sheets

AUTOMATIC FOCUSING SYSTEM WITH PHASE DIFFERENCE DETECTING UNIT EMPLOYING CORRELATION OPERATING CIRCUIT

BACKGROUND OF THE INVENTION

This invention relates to a phase difference detecting unit which is applied to an automatic focus detector for a camera.

Figure 8:
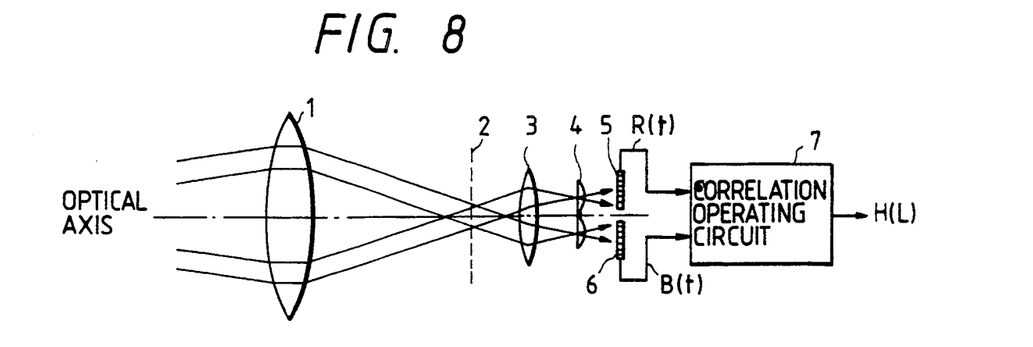
FIG. 8 illustrates an automatic focusing system employing the phase difference detecting unit according to the present invention.

A conventional automatic focus system employing a phase difference detection method is shown in FIG. 8. A condenser lens 3, a separator lens 4, and a phase difference detecting unit 8 are positioned behind a plane 2, which is equivalent to the surface of a film and is located behind the photographing lens 1 of a camera (not shown).

The phase difference detecting unit 8 consists of linear image pickup devices 5 and 6, which receive a pair of optical images of an object (not shown) formed by the separator lens 4. The pickup devices subject the images to photo-electric conversion. A correlation operating circuit 7 determines whether or not the lens 1 is focused. This determination is made from picture element signals which are produced in accordance with luminance distributions of devices 5 and 6.

The images formed on the image pickup devices 5 and 6 are moved towards the optical axis when the object's image is located in front of the equivalent plane 2. This is referred to as a front focusing condition. The images are moved away from the optical axis in the rear focusing condition. When the lens is properly focused, the images come to predetermined positions which are located between these positions taken in the front focusing condition and those taken in the rear focusing condition. Hence, the correlation operating circuit 7 can determine whether or not the lens is correctly focused on the object. More specifically, the circuit 7 performs a correlation operation for the picture element signals outputted by the linear image pickup devices to detect the relative distances of the images from the optical axis. In this manner, the correlation operating circuit 7 determines whether or not the correct focusing condition is obtained.

The above phase difference detecting method will be described in more detail below. The picture element signals are outputted by the linear image pickup devices 5 and 6 with predetermined synchronizing timing and can be represented by signals R(t) and B(t), respectively (as shown in FIG. 8). The relative shift (amount of relative movement) of these picture element signals can be represented by L. In the detecting method, a correlation operation is performed in accordance with equation (1) below, to obtain a correlation value H(L). With a predetermined amount of movement $L_1$, it is determined that the correct focusing condition is attained when the correlation value is minimum (or maximum). When, with an amount of movement $L_2$ different from the predetermined amount of movement $L_1$, the correlation value is maximum (or minimum), it is determined that the front focusing condition (or the rear focusing condition) is obtained. In addition, the error per unit $\Delta L$ provided until the correct focusing condition is obtained is estimated from $(L_2-L_1)/H(L)$, where $$H(L) = \sum_{t=0}^{n} |B(t) - R(t - L)| \tag{1}$$

and where n is the number of picture element, and L is an integer variable ranging from 0 to 10.

Heretofore, the above-described correlation operation is carried out with a digital operation device, such as a microprocessor, with the output picture element signals of the linear image pickup devices 5 and 6 converted into digital data. However, the method is disadvantageous in that a circuit large in scale and intricate in arrangement is required for implementation. Moreover, the speed of the arithmetic operation is relatively slow.

Figure 9:
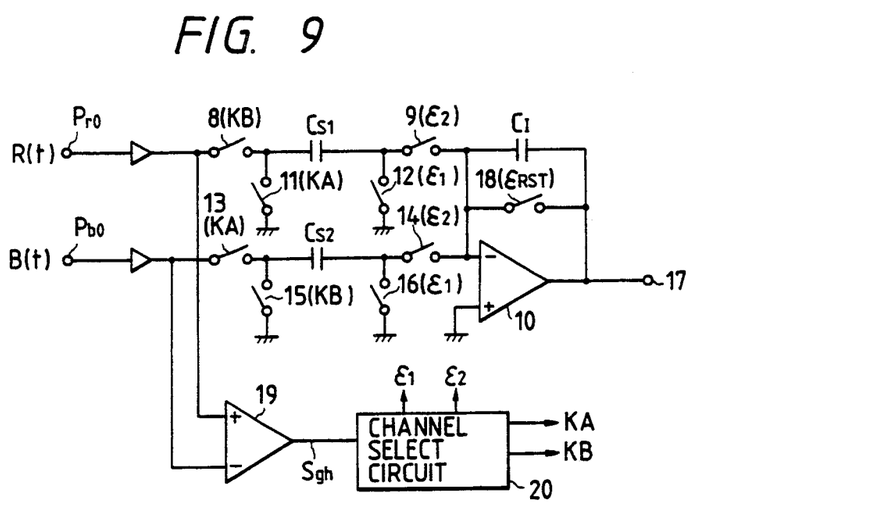
FIG. 9 is a circuit diagram illustrating a conventional correlation operating circuit.

In order to overcome these difficulties, an analog correlation operation circuit has been proposed, for instance, by Unexamined Japanese Patent Application No. 229211/1990, as shown in FIG. 9.

In this circuit, signals R(t) and B(t) are outputted in a time-series mode by the linear image pickup devices 5 and 6 (FIG. 8) and are applied to input terminals $P_{r0}$ and $P_{b0}$, respectively. The input terminal $P_{r0}$ is connected to the inverting input terminal (−) of differential amplifier 10 through a buffer amplifier and a series circuit consisting of a switching element 8, a capacitive element $C_{s1}$, and a switching element 9. Both terminals of the capacitive element $C_{s1}$ are grounded through switching elements 11 and 12. Similarly, the input terminal $P_{b0}$ is connected to the non-inverting input terminal (+) of differential amplifier 10 through a buffer amplifier and a series circuit composed of a switching element 13, a capacitive element $C_{s2}$, and a switching element 14.

Both terminals of the capacitive element $C_{s2}$ are grounded through switching elements 15 and 16. A parallel circuit composed of a capacitive element $C_1$ and a switching element 18 is connected between the inverting input terminal and the output terminal 17 of the differential amplifier 10, the non-inverting input terminal of the amplifier 10 being grounded.

The input terminals $P_{r0}$ and $P_{b0}$ are further connected to the non-inverting and inverting input terminals of analog comparator 19, respectively. The output terminal of the comparator 19 is connected to channel select circuit 20.

The channel select circuit 20 provides select signals $\epsilon_1$, $\epsilon_2$, KA and KB to control the on-off operations of the switching elements 8, 9, and 11 through 16.

Analog comparator 19 outputs a signal $S_{gn}$ having a high ("H") level when $R(t) \geq B(t)$ and a low ("L") level when $R(t) < B(t)$. Channel select circuit 20 determines the voltage levels of the select signals $\epsilon_1$, $\epsilon_2$, KA and KB in accordance with the levels of the signal $S_{gn}$.

Figure 10:
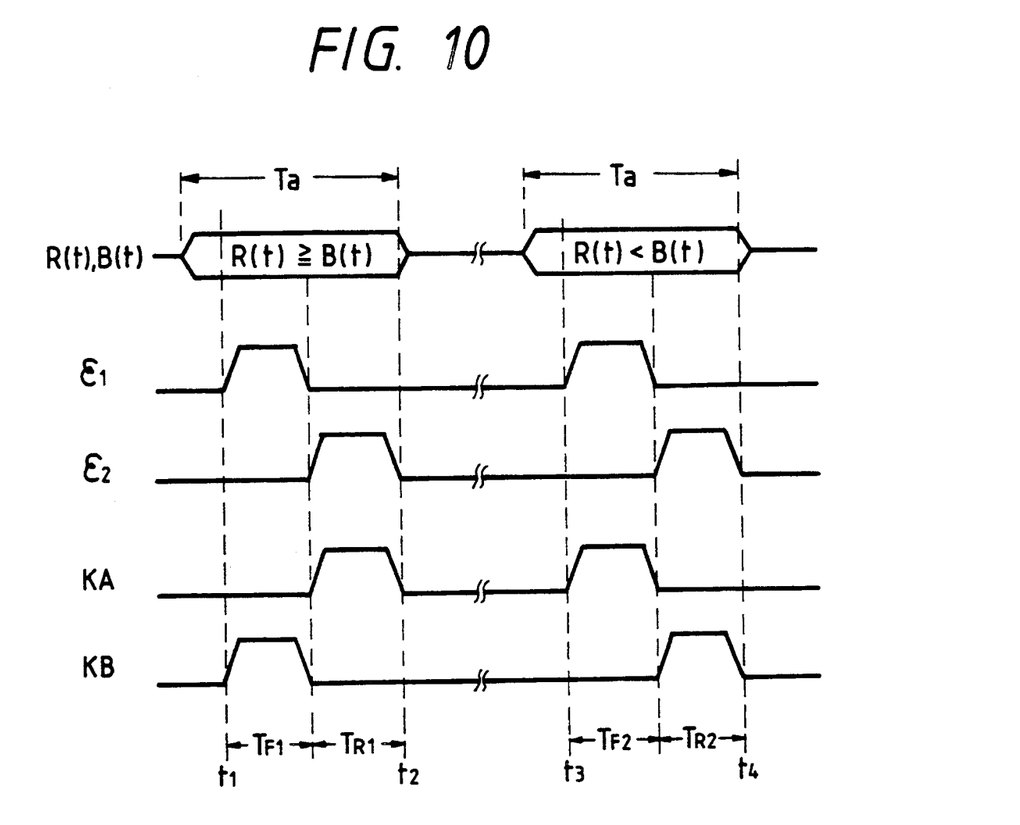

The operation of the arithmetic unit organized as described above will now be described with reference to the timing chart of FIG. 10.

First, switching element 18 is turned on with a reset signal $\epsilon_{RST}$ from a reset device (not shown). As a result, the capacitive element $C_1$ is discharged. Thereafter, the switching element 18 is turned off so as to start the operations shown in FIG. 10.

When the relationship between the operated signals is $R(t) \geq (B(t)$, as shown in the period between times $t_1$ and $t_2$, the signal $S_{gn}$ is at "H" level. In accordance with signal $S_{gn}$, the select signals $\epsilon_1$, $\epsilon_2$, KA and KB are produced with a predetermined timing scheme. More specifically, the select signals $\epsilon_1$ and $\epsilon_2$ are produced in such a manner that they are not raised to "H" level at the same time, and similarly the select signals KA and KB are produced in such a manner that they are not raised to "H" level at the same time.

In the case where $R(t) < B(t)$ is established, as shown in the period between times $t_3$ and $t_4$, the signal $S_{gn}$ is set to "L". The select signals KA and KB are produced in opposite phase relative to the signals KA and KB set in the period of time marked by $t_1$ and $t_2$. The select signals $\epsilon_1$ and $\epsilon_2$ are produced with the same timing scheme in either of the periods marked by $t_1$-$t_4$, irrespective of the level of the signal $S_{gn}$.

In the first half $T_{F1}$ of the period between times $t_1$ and $t_2$, switching elements 12 and 16 and switching elements 8 and 15 are turned on due to select signals $\epsilon_1$, $\epsilon_2$, KA and KB; thus, capacitive element $C_{s1}$ is charged by the signal R(t), while the capacitive element $C_{s2}$ is discharged (FIG. 9).

In the second half $T_{R1}$ during the period between times $t_1$ and $t_2$, the switching elements 9 and 11 are turned on, so that the charge of the capacitive element $C_{s1}$ is coupled to the charge of the capacitive element $C_1$. At the same time, the switching elements 13 and 14 are tuned on, while the switching elements 15 and 16 are turned off. This allows the signal B(t) to be supplied through the capacitive element $C_{s2}$ to the differential amplifier 10. As a result, the charge q(t) defined by equation (2) below is stored in capacitive element $C_1$.

$$q(t) = (C_1/C_{s1}) \times R(t) - (C_1/C_{s2}) \times B(t) \tag{2}$$

when R(t)<B(t) during the first half $T_{F2}$ of the period between times $t_3$ and $t_4$, the switching elements 11 and 13 and the switching elements 12 and 16 are tuned on, so that the capacitive element $C_{s2}$ is charged by signal B(t), while the capacitive element $C_{s1}$ is discharged. In the second half $T_{R2}$ of the same period of time, the switching elements 14 and 15 are turned on, and the charge of the capacitive element $C_{s2}$ is added to the charge of the capacitive element $C_1$. At the same time, the switching elements 8 and 9 are turned on while the switching elements 11 and 12 are turned off, so that the signal R(t) is supplied through the $C_{s1}$ to the differential amplifier 10. As a result, the charge q(t) represented by equation (3) below is stored in the capacitive element $C_1$:

$$q(t) = (C_1/C_{s2}) \times B(t) - (C_1/C_{s1}) \times R(t) \tag{3}$$

As is apparent from the above-described equations (2) and (3), the arithmetic unit As operative to cause the charge corresponding to the correlation value to be stored in the capacitive element $C_1$. The value is obtained by subtracting one of the signals R(t) or B(t), whichever is lower in level, from the other. Therefore, by repeatedly carrying out the above-described arithmetic operation with respect to the operated signals R(1), . . . and R(n) and B(1) through B(n), the sum of the absolute values of the differences between these signals is provided at the output terminal 17; that is, a correlation value H represented by equation (4) below is output.

$$H = \sum_{t=0}^{n} |(C_I/C_{a2}) \times B(t) - (C_I/C_{a1}) \times R(t)| \tag{4}$$

Next, the signals R(t) and B(t) are read from the linear image pickup devices 5 and 6 with a phase difference, and, with respect to the signals thus read, the above-described arithmetic operation is carried out, so that, with respect to the phase difference a correlation value is obtained. Similarly, the correlation operation is performed with respect to other phase differences. As a result, the distribution of correlation values corresponding to the above-described equation (1) is obtained. The correct focusing condition can, thereby, be determined from the distribution.

A phase difference detecting circuit based on the above-described analog correlation operation is advantageous in that it is capable of operation or at least high speeds. However, as the speed is increased, the accuracy of the operation greatly decreases. Specifically, when the operations of the switching elements affect the capacitive loads connected to the input terminals $P_{r0}$ and $P_{b0}$, the voltages at the inverting and non-inverting input terminals of the analog comparator 19 are changed. Accordingly the voltage at the output terminal $S_{gn}$ of the analog comparator 19 is also changed. Hence, the on-off control of the switching elements is not correctly carried out, which decreases the accuracy of the correlation result obtained.

In the case where buffer amplifiers having large output current capacities are connected to the input terminals $P_{r0}$ and $P_{b0}$, the circuit is unavoidably bulky. Accordingly, the consumption of current is increased while the quantity of heat generated is increased.

SUMMARY OF THE INVENTION

In view of the foregoing, an object of this invention is to provide a phase difference detecting unit which performs an analog correlation operation with high accuracy.

The foregoing object of the invention has been achieved by the provision of a phase difference detecting unit for an automatic focusing system comprising: sensor means including first photo-electric conversion means for converting one of a pair of optical images of an object into an analog electrical signal with a plurality of picture elements, and second photo-electric conversion means for converting the other of the pair of optical images into an analog electrical signal with a plurality of picture elements, the sensor means reading the analog electrical signals provided by the photo-electric conversion means with a predetermined period for every picture element in such a manner that the analog electrical signals are shifted in phase from each other; comparison means for comparing the analog electrical signal corresponding to the one optical image and the analog electrical signal corresponding to the other optical image with each other which are outputted by the sensor means with a predetermined period, to determine which one of the analog electrical signals is larger or smaller in level; and a switched capacitor integrator in which, in each output period of the sensor means, a first capacitive element is charged with one of the analog electrical signals while a second capacitive element is charged with the other, and by adding the charge of the first capacitive element to the charge of the second capacitive element in accordance with an output signal of the comparison means, a charge is stored in a third capacitive element which corresponds to a value which is obtained by subtracting the analog electrical signal lower in level from said analog electrical signal higher in level for every picture element, and by storing the charge in the third capacitive element over a plurality of periods, charges are integrated which correspond to the sum of charges each corresponding to the value which is obtained by subtracting the analog electrical signal lower in level from the analog electrical signal higher in level, in which, according to the invention, the switched capacitor integrator has switching means for connecting, when the charges of the first and second capacitive elements are added to each other in each period, loads equivalent in capacitance to the first and second capacitive elements to the output of the sensor means.

In the phase difference detecting unit, means for changing the capacitance of the third capacitive element is provided.

With the phase difference detecting unit of the present invention, the capacitive loads applied to the input terminals thereof are maintained unchanged during correlation operations, and therefore the correlation value can be obtained with high accuracy.

Furthermore, since the capacitance of the third capacitive element in the switched capacitor integrator can be changed, the gain of the switched capacitor integrator can be adjusted.

BRIEF DESCRIPTION OF THE DRAWINGS

FIG, 10 is a timing chart for the correlation operation in the circuit shown in FIG. 9.

DESCRIPTION OF THE PREFERRED EMBODIMENTS

Preferred embodiments of the present invention will be described with reference to the accompanying drawings.

Figure 1:
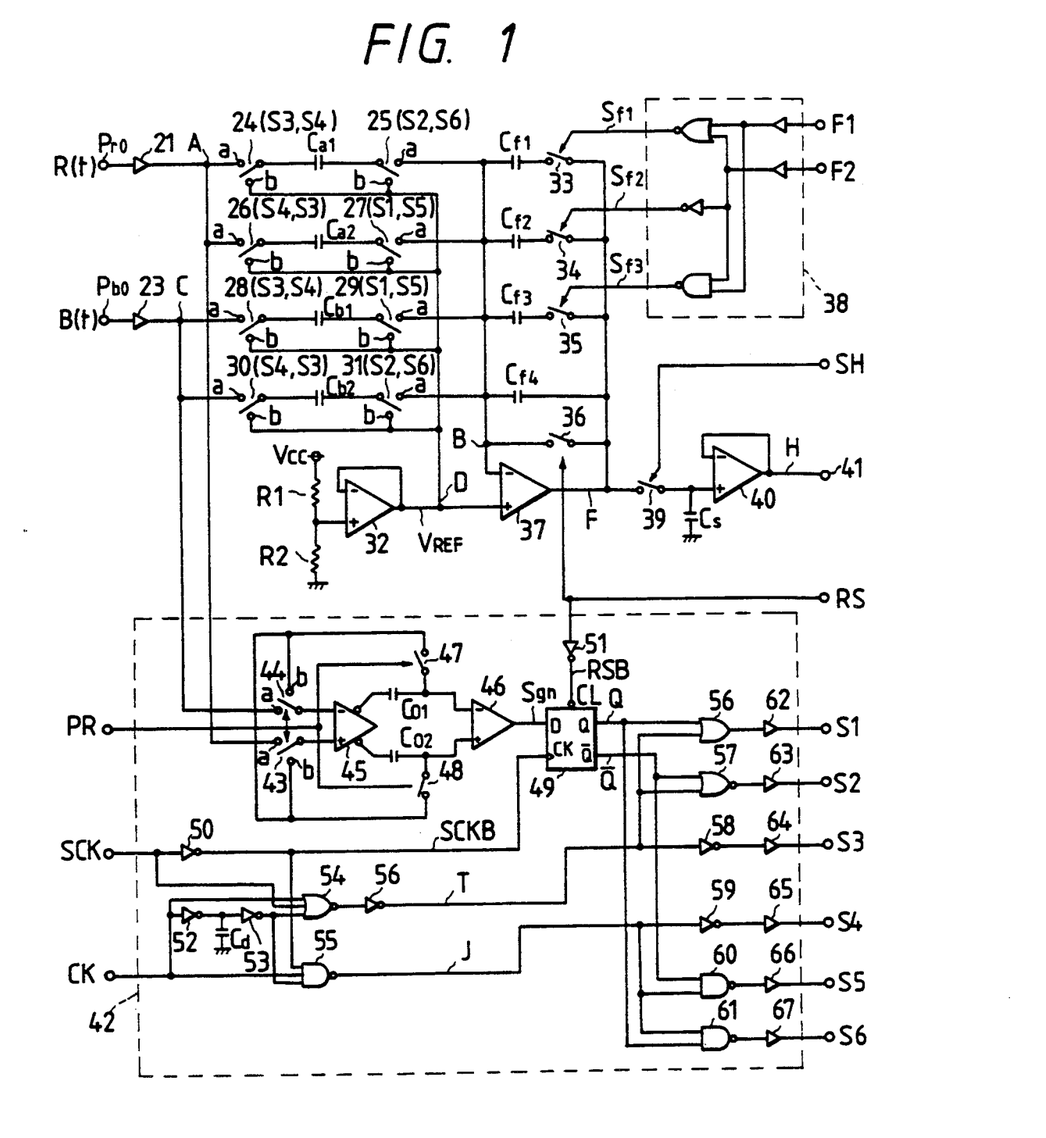
FIG. 1 tea circuit diagram illustrating a correlation operating circuit of the present invention.

As shown in FIG. 1, a first input terminal $P_{r0}$ is connected to a buffer amplifier 21, the output terminal A of which is connected to the inverting terminal B of a differential amplifier 37. This connection is made through a first network, which is a series circuit composed of a switching circuit 24, a capacitive element $C_{a1}$, and a switching circuit The connection is also made through a second network, which is also a series circuit composed of a switching circuit 26, a capacitive element $C_{a2}$, and a switching circuit 27.

The armature of the switching circuit 24 is tripped over to its contact a in response to a control signal S3, and to its contact b in response to a control signal S4. The armature of the switching circuit 25 is tripped over to its contact a in response to a control signal S2, and to its contact b in response to a control signal S6. The armature of the switching circuit 26 is tripped over to its contact a in response to the control signal S4, and to its contact b in response to the control signal S3. The armature of the switching circuit 27 is tripped over to its contact a in response to a control signal S1, and to its contact b in response to a control signal S5.

The contacts b of these switching circuits 24, 25, 26 and 27 are connected to the non-inverting input terminal D of the differential amplifier 37. A second input terminal $P_{b0}$ is connected to a buffer amplifier 23, the output terminal C of which is connected to the inverting terminal B of a differential amplifier 37 through a third network which is a series circuit consisting of a switching circuit 28, a capacitive element $C_{b1}$, and a switching circuit 29. The connection is also made through a second network which is also a series circuit consisting of a switching circuit 30, a capacitive element $C_{b2}$, and a switching circuit 31.

The armature of the switching circuit 28 is tripped over to its contact a in response to the control signal S3, and to its contact b in response to the control signal S4. The armature of the switching circuit 29 is tripped over to its contact a in response to a control signal S1, and to its contact b in response to the control signal S5. The armature of the switching circuit 30 is tripped over to its contact a in response to the control signal S4, and to its contact b in response to the control signal 53. The armature of the switching circuit 31 is tripped over to its contact a in response to the control signal S2, and to its contact b in response to the control signal S6.

The contacts b of these switching circuits 28, 29, 30 and 31 are connected to the non-inverting input terminal D of the differential amplifier 37.

The capacitive elements $C_{a1}$, $C_{a2}$, $C_{b1}$ and $C_{b2}$ are equal in capacitance to each other; that is, each has a capacitance Cc.

A constant voltage $V_{REF}$ provided by a constant voltage generating circuit composed of resistors R1 and R2 and a buffer amplifier 31 is applied to the non-inverting input terminal D of the differential amplifier 37. The constant voltage $V_{REF}$ has been adjusted to less than the minimum operating voltage of signals R(t) and B(t).

The inverting terminal B of the differential amplifier 37 is connected to the output terminal F through a network consisting of a capacitive element $C_{f1}$ and a switching element 33, a network of a capacitive element $C_{f2}$ and a switching element 34, a network of a capacitive element $C_{f3}$ and a switching element 35, and a network of a capacitive element $C_{f4}$ and a switching element 36. The on-off operation of the switching element 36 is controlled by a reset signal RS, and the on-off operations of the switching elements 33, 34 and 35 are controlled by switching control signals $S_{f1}$, $S_{f2}$ and $S_{f3}$, respectively, outputted by a decode circuit 38.

The output terminal F of the differential amplifier 37 is connected to an output buffer amplifier 40 through a sample and hold circuit including a switching element 39 and a capacitive element $C_S$. The output signal H of the amplifier 40 is applied to an output terminal 41. The switching element 39 is turned on in synchronization with a control signal SH, which is raised to "H" level when a correlation value is calculated; thus, a sampling operation is carried out by turning on the switching element in this manner.

A control circuit 42 is provided to produce the aforementioned control signals 51 through 56 for controlling the operations of the switching elements 24 through 31. The output terminal A of the buffer amplifier is connected through a switching circuit 43 to the non-inverting input terminal of a differential amplifier 45, and the output terminal C of the buffer amplifier 23 is connected through a switching circuit 44 to the inverting input terminal of the differential amplifier 45. The armatures of switching circuits 43 and 44 are tripped over to their contacts a or b in response to a preset signal. The contacts b of the switching circuits 43 and 44 are connected to each other.

The differential amplifier 45 has two output terminals. One of the two output terminals is connected through a capacitive element $C_{01}$ to the inverting terminal of a differential amplifier 46, and the inverting terminal is connected through a switching element 47 to the contact b of the switching circuit 44. The other output terminal is connected through a capacitive element $C_{02}$ to the non-inverting terminal of the differential amplifier 46, and the non-inverting terminal is connected through a switching element 48 to the contact b of the switching circuit 43. The switching elements 47 and 48 are turned on when the preset signal PR is at "H" level, and turned off when sisal PR is at "L" level.

The output terminal of the differential amplifier 46 is connected to an input terminal D of a D type flip-flop 49. A first clock signal SCK is applied to an inverter circuit 50, so that the latter outputs an inverting signal SCKB. The inverting signal SCKB thus outputted is applied to the clock input terminal CK of the D type flip-flop 49. The reset signal RS is applied to an inverter circuit 51, so that the circuit outputs an inverting signal RSB. The inverting signal RSB thus outputted is applied to the reset contact CL of the D type flip-flop 49. As a result, the flip-flop circuit outputs two opposite logic signals through its two output terminals Q and $\overline{Q}$.

The first clock signal SCK and the second clock signal CK are processed into clock signals T and J with the aid of a delay circuit consisting of inverters 52 and 53, a capacitive element Cd, and a first decode circuit. The first decode circuit consists of NOR gate 54, NAND gate 55, and inverters 50 and 56. The clock signals T and J and the output signals Q and $\overline{Q}$ are processed into control signals S1, S2, S3, S4, S5 and S6 by a second decode circuit including NOR gates 56 and 57, inverters 58 and 59, and NAND gates 60 and 61. The control signals thus formed are applied through buffer circuits 62, 63, 64, 65, 66 and 67 to their respective switching circuits 24 through 31.

The first clock signal SCK is a rectangular wave signal whose period is equal to the period used to scan the picture elements by the linear image pickup devices 5 and 6 (FIG. 8). The second clock signal CK is a rectangular wave signal whose period is equal to a period of operating the switching elements 24 through 31 in synchronization with the first clock signal SCK.

Figure 2:
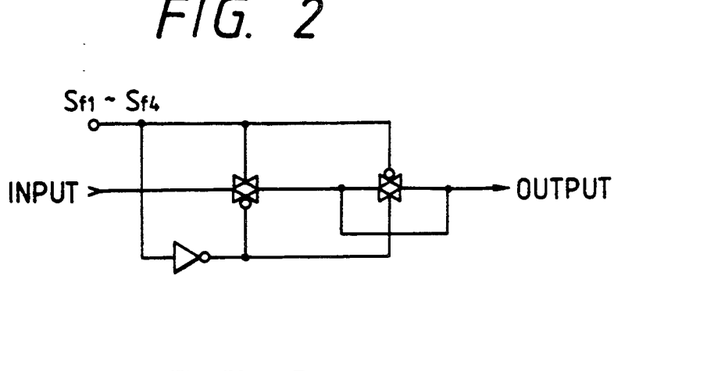
FIG. 2 Is a circuit diagram illustrating a switching element that may be employed in the operating circuit shown in FIG. 1.

The switching elements 33 through 36 can be CMOS analog switch circuits as shown in FIG. 2.

The correlation operating circuit shown in FIG. 1 corresponds to the correlation operating circuit 7 in FIG. 8. When the signals R(t) and B(t) are read from the linear image pickup devices 5 and 6 in accordance with a predetermined scanning timing scheme (i.e., with the timing of the first clock signal SCK), the signals are applied to the input terminals $P_{r0}$ and $P_{b0}$. The operating circuit then subjects them to an arithmetic operation so as to output a correlation value H.

In operation, the decode circuit 38 produces the control signals $S_{f1}$, $S_{f2}$ and $S_{f3}$ in accordance with the logic values of input data F1 and F2 as indicated in Table (1) below, thereby selectively turning on the switching elements 33 through 35.

TABLE (1)

| F1 | F2 | $S_{f1}$ | $S_{f2}$ | $S_{f3}$ | 33 | 34 | 35 |
|---|---|---|---|---|---|---|---|
| L | L | H | H | H | ON | ON | ON |
| H | L | L | H | H | OFF | ON | ON |
| L | H | L | L | H | OFF | OFF | ON |
| H | H | L | L | L | OFF | OFF | OFF |

By setting the input data F1 and F2 to the appropriate values, the capacitance between the inverting input terminal B and the output terminal F of the differential amplifier 37 can be adjusted in four steps. For convenience in description, it is assumed that the total capacitance connected between the inverting input terminal B and the output terminal F of the differential amplifier 37 is represented by $C_F$.

When the switching element 36 is turned on by the reset signal RS, the inverting input terminal of the differential amplifier 37 is connected through the switching element 36 to the output terminal. For this case, the capacitance $C_F$ formed between the two terminals is discharged.

The operation of the control circuit 42 will now be described. First, before the correlation operation, the preset signal PR changes from "L" to "H" and back to "L" in level, in that order. When it is at "H" level, the switching elements 43, 44, 47 and 48 are turned on, the capacitive elements $C_{01}$ and $C_{02}$ are charged to the amount of offset in the differential amplifier 45, the offset adjustment is carried out. After the offset adjustment, the preset signal PR is set to "L" level, so that the armatures of the switching elements 43 and 44 are tripped over to the respective contacts a, and the switching elements 47 and 48 are turned off. As a result, the inverting input terminal and the non-inverting input terminal of the differential amplifier 45 are connected to the terminals A and C, respectively.

In the case where the relation between the voltage levels of the operated signals provided at the terminals A and C is (R(t)≧B(t)), the differential signal thereof is provided between the output terminals of the differential amplifier 45; that is, in the differential amplifier 46, the potential at the non-inverting input terminal is higher than that the differential amplifier 46 outputs the signal $S_{gn}$ at a logic value "H".

In the case where R(t)<B(t), the differential signal thereof is provided between the output terminals of the differential amplifier 45, and therefore in the differential amplifier 46, the potential at the inverting input terminal is higher than that at the non-inverting input terminal. As a result, the differential amplifier 46 provides the signal $S_{gn}$ at a logic value "L".

Signal $S_{gn}$ is applied to the D type flip-flop circuit 49 in synchronization with the first clock signal SCK which occurs with the same timing as signals R(t) and B(t). As a result, the flip-flop circuit provides outputs as indicated in Table 2:

TABLE (2)

| Condition | $S_{gn}$ | Q | $\overline{Q}$ |
|---|---|---|---|
| R(t)≧B(t) | H | H | L |
| R(t)<B(t) | L | L | H |

Figure 3:
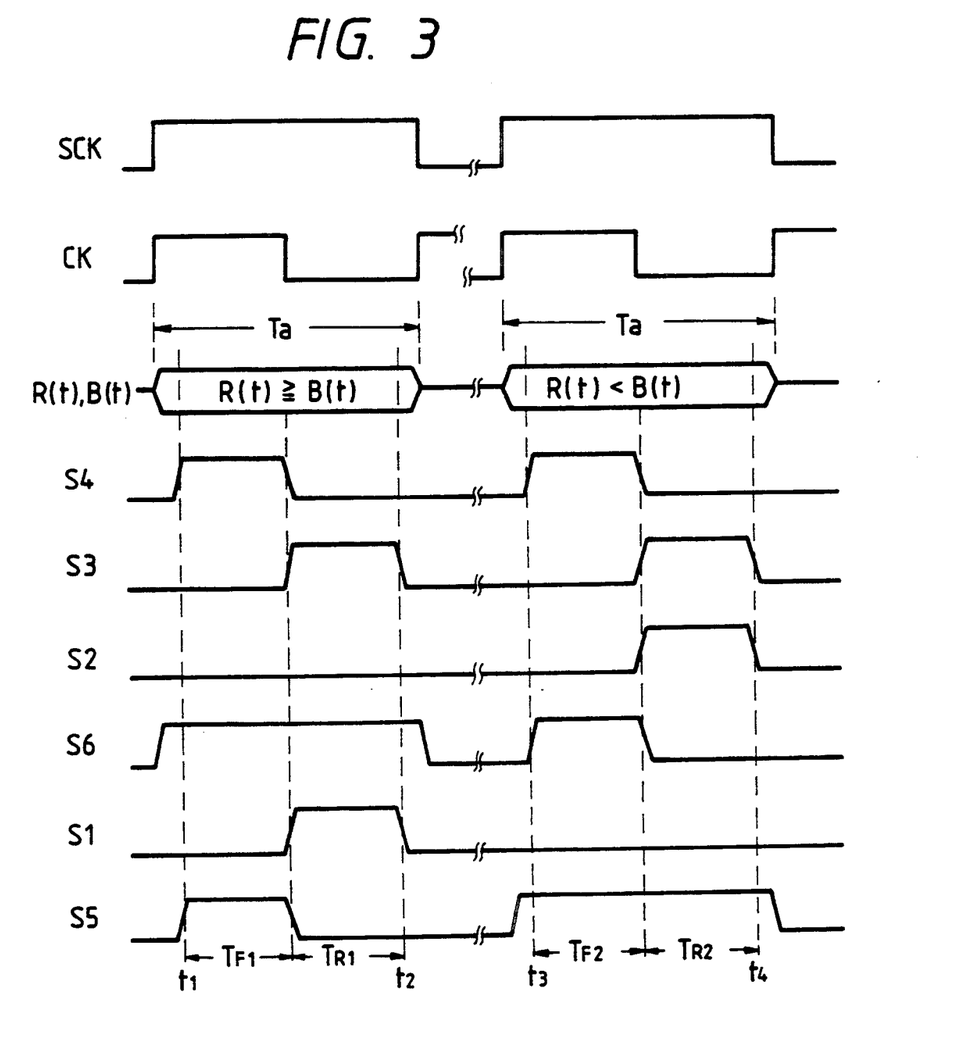
FIG. 3 is a timing chart of the operation of the operating circuit.

Control circuit 42 decodes the output signals Q and $\overline{Q}$ produced according to the mathematical relation between signals R(t) and B(t) and the first and second clock signals, SCK and CK. The decoding operation provides the control signals S1 through S6 in synchrony with the periods for reading the relation between signals R(t) and B(t), as shown in FIG. 3.

The correlation operation is carried out in accordance with the control signals, with the signals R(t) and B(t) being outputted by the linear image pickup devices 5 and 6 in the phase difference detecting unit 8 as shown in FIG. 8.

Before the correlation operation is started, the input signals F1 and F2 are applied so that the switching elements 33 through 35 are selectively turned on to set the capacitance $C_F$ (the capacitance between the inverting input terminal and the output terminal of the differential amplifier 37). At this time, the reset signal RS is raised to "H" level temporarily, so that the capacitance $C_F$ is discharged. In addition, the offset adjustment of the differential amplifier 45 is carried out with the preset signal PR.

The signals R(t) and B(t) are inputted with a period $T_a$,

The case where the relation between these signals is $R(t) \geq B(t)$, as in the period of time between times $t_1$ and $t_2$, will now be described. When the polarity signal $S_{gn}$ is raised to "H" level, as indicated in the above-described Table (2), in the first half $T_{F1}$ of the period between times $t_1$ and $t_2$, the control signal S1 is at "L" level, the control signal S2 is at "L" level, the control signal S3 is at "L" level, the control signal S4 is at "H" level, the control signal S5 is at "H" level, and the control signal S6 is "H" level. In the second half $T_{R1}$ of the same period of time, the control signal S1 is at "H" level, the control signal S2 is at "L" level, the control signal S3 is at "H" level, the control signal S4 is at "L" level, the control signal S5 is at "L" level, and the control signal S6 is at "H" level.

Figure 4:
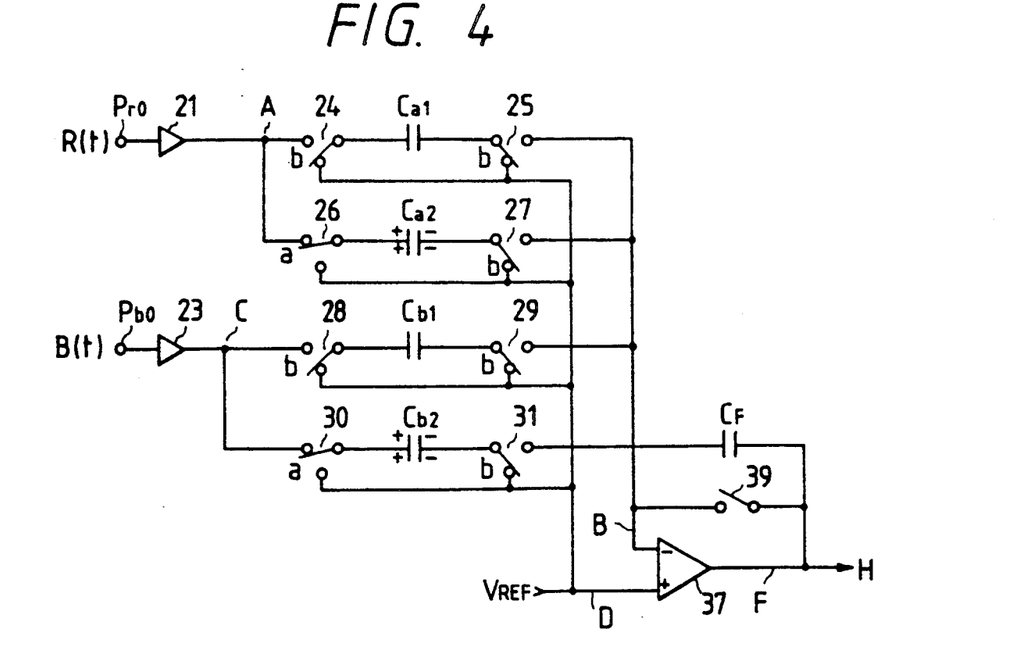
FIGS. 4 through 7 illustrate a correlation operation performed in the operating circuit.
Figure 5:
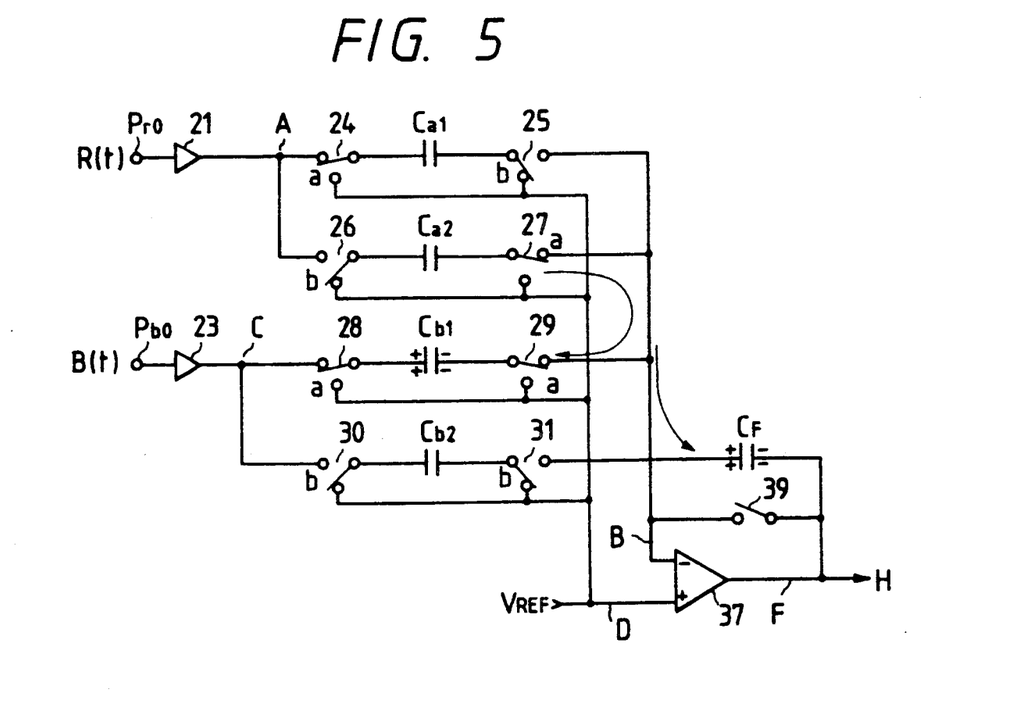

Accordingly, in the first half $T_{F1}$ of the period of time, the switching circuits 24 through 31 are operated as shown in FIG. 4, so that the capacitive elements $C_{a1}$ and $C_{b1}$ are discharged, while the capacitive elements $C_{a2}$ and $C_{b2}$ are charged in response to the signals R(t) and B(t), respectively. In the second half $T_{R1}$ of the same period of time, the switching circuits 24 and 31 are operated as shown in FIG. 5; that is, the capacitive element $C_{a2}$ is connected in series to the capacitive element $C_{b1}$ through the switching circuits 27 and 29, so that the charge q(t), corresponding to the potential difference between the signals R(t) and B(t), is stored as capacitance $C_F$. The charge $\Delta q(t)$ is represented by equation (7) below:

$$\Delta q(t) = (C_F/C_{a2}) \times R(t) - (C_F/C_{b1}) \times B(t) \quad (7)$$

The case where R(t) < B(t), as in the case of the period of time between the time instants $t_3$ and $t_4$ in FIG. 3, will now be described. As the polarity signal $S_{gn}$ is set to the "L" level, as indicated in the above-described Table (2), in the first half $T_{F2}$ of the period of time between times $t_3$ and $t_4$, the control signal S1 is at the "L" level, the control signal S2 is at the "L" level, the control signal S3 is at the "L" level, the control signal S4 is at the "H" level, the control signal S5 is at the "H" level, and the control signal S6 is at the "H" level. In the second half $T_{R2}$ of the same period of time the control signal S1 is at the "L" level, the control signal S2 is at the "H" level, the control signal S3 is at the "H" level, the control signal S4 is at the "L" level, the control signal S5 is at the "H" level, and the control signal S6 is at the "L" level.

Figure 6:
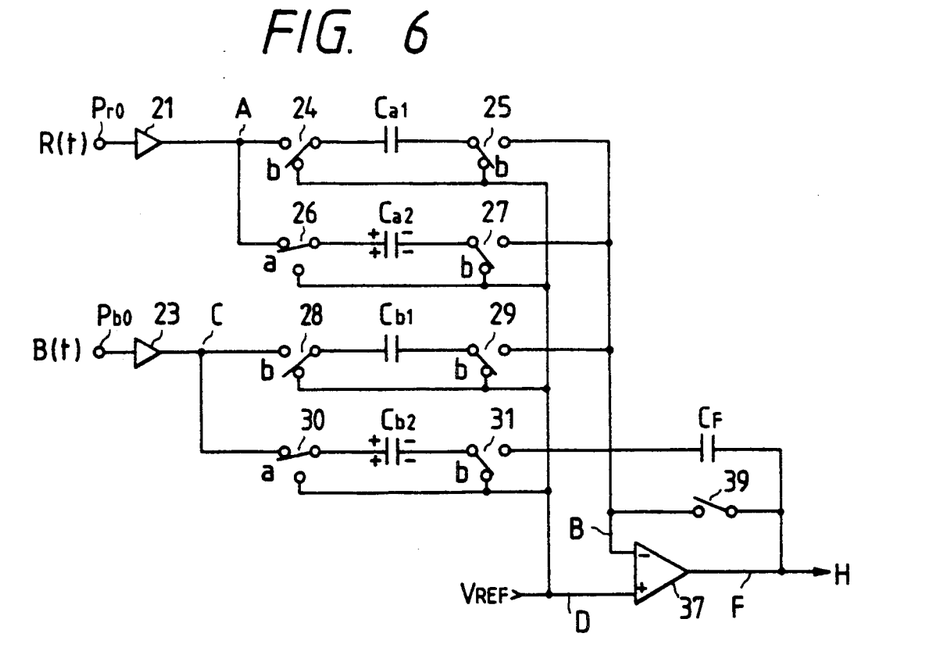
Figure 7:
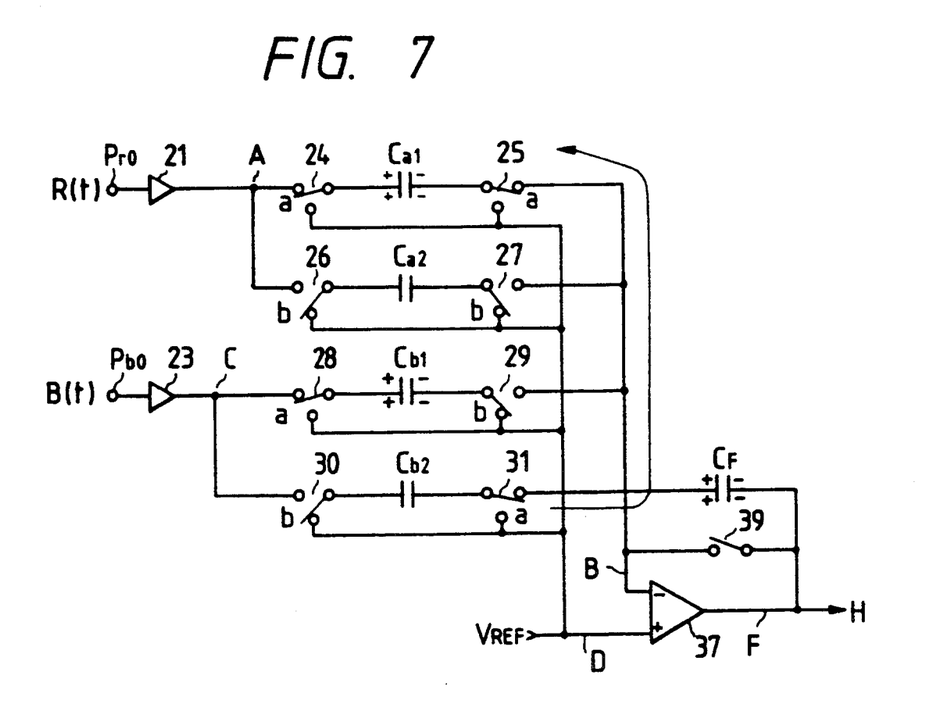

Accordingly, in the first half $T_{F2}$ of the period of time, the switching circuits 24 through 31 are operated as shown in FIG. 6, so that the capacitive elements $C_{a1}$ and $C_{b1}$ are discharged, while the capacitive elements $C_{a1}$ and $C_{b2}$ are charged in response to the signals R(t) and B(t), respectively. In the second half $T_{R2}$ of the same period of time, the switching circuits 24 and 31 are operated as shown in FIG. 7; that is, the capacitive element $C_{a1}$ is connected in series to the capacitive element $C_{b2}$ through the switching circuits 25 and 31, so that the charge q(t) corresponding to the potential difference between the signals B(t) and R(t) is stored in a capacitance $C_F$. The charge q(t) is represented by the following equation (8):

$$\Delta q(t) = (C_F/C_{b2}) \times B(t) - (C_F/C_{a1}) \times R(t) \quad (8)$$

As is seen from equations (7) and (8) described above, the charge corresponding to the value which is obtained by subtracting the signal (either R(t) or B(t)) lower in level from the signal higher in level is stored in the capacitance element $C_F$. Hence, by repeatedly performing the above-described operations with respect to the signals R(1), ... and R(n), and B(1), ... and B(n), the sum of the absolute values of the differences between those signals is provided at the output terminal 41. This sum is the correlation value H, which can be represented by equation (9).

$$H = \sum_{t=1}^{n} |(C_F/C_C) \times B(t) - (C_F/C_C) \times R(t)| \quad (9)$$

where $C_C = C_{a1} = C_{a2} = C_{b1} = C_{b2}$

Next, signals R(t) and B(t) are read from the linear image pickup devices 5 and 6 in such a manner that they are shifted in phase. That is, signals and R(t-L) shifted in phase are read out. With respect to the signals thus read out, the above-described operations are carried out, as a result of which a correlation value H(L) with respect to the phase difference L is obtained. Similarly, the correlation operation is carried out for the other phase differences, whereby the distribution of correlation values represented by the following equation (10) below can be obtained. In this manner, it can be determined from the distribution of correlation values whether or not the correct focusing condition is obtained.

$$H(L) = (C_F/C_C) \times \sum_{t=1}^{n} |B(t) - R(t-L)| \quad (10)$$

As was described above, the correlation operation is carried out in synchronization with the reading of signals R(t) and B(t) to be operated from the linear image pickup devices. In this way, it can be determined quickly whether or not the correct focusing condition has been obtained.

Furthermore, even when the switching circuits 24 through 31 are operated as shown in FIGS. 4 through 7, the capacitive loads to the buffer amplifiers 21 and 23 remain unchanged; that is, the voltages at the terminals A and C are not affected by the operations of the switching elements. Thus, with the aid of the control circuit 42 the arithmetic operation can produce the correlation value with high accuracy.

As is seen from the above-described equation (10), the capacitance $C_F$ can be changed by selectively turning on the switching elements 33 through 35 with the input signals F1 and F2. In this manner, the circuit gain can be set to a desired value. For example, in the case where the invention is applied to a camera's automatic focusing system, the process can be achieved in the most suitable dynamic range with the capacitance $C_F$ adjusted in accordance with the luminance of the object.

As was described above, the capacitive loads applied to the input terminals of the phase difference detecting unit of the present invention remain unchanged during correlation operation, and therefore the correlation value can be obtained with high accuracy.

Furthermore, since the capacitance of the third capacitive element in the switched capacitor integrator can be changed, the gain of the switched capacitor integrator can be adjusted; thus, the process can be performed in the most suitable dynamic range.

What is claimed is:

1. An automatic focusing system, comprising:
    sensor means for receiving a pair of optical images with a predetermined period of time, and for producing a plurality of output signals representative of said images;
    comparison means for comparing said optical images to determine which of said output signals has a higher or lower level relative to each other; and
    integrator means for storing a difference of said plurality of output signals in accordance with the determination by said comparison means, and for maintaining the levels of said plurality of output signals by connection with said sensor means.

2. The automatic focusing system according to claim 1, wherein said sensor means comprises photo-electric conversion means for converting said pair of optical images of said object into first and second analog electrical signals with a plurality of picture elements.

3. The automatic focusing system according to claim 2, said integrator means comprising:
    a first capacitive means for storing a capacitance in accordance with said first analog electrical signal;
    a second capacitive means for storing a capacitance in accordance with said second analog electrical signal; and
    a third capacitive means for storing a capacitance in accordance with a difference between charges stored in said first and second capacitive means.

4. The automatic focusing system according to claim 3, wherein said integrator means further comprises equivalency means for connecting loads equivalent in capacitance to said first and second capacitive means and to sensor means.

5. A difference detecting unit for receiving a pair of optical images from a sensor means with a predetermined period of time, and for producing a correlation of said images, said difference detecting unit comprising:
    comparison means for comparing said optical images to determine which of said output signals has a higher or lower level relative to each other; and
    integrator means for storing a difference of said plurality of output signals in accordance with the determination by said comparison means, and for maintaining the levels of said plurality of output signals by connection with said sensor means.

6. The difference detecting unit according to claim 5, wherein said sensor means Comprises photo-electric conversion means for converting said pair of optical images of said object into first and second analog electrical signals with a plurality of picture elements.

7. The difference detecting unit according to claim 6, said integrator means comprising:
    a first capacitive means for storing a capacitance in accordance with said first analog electrical signal;
    a second capacitive means for storing a capacitance in accordance with said second analog electrical signal; and
    a third capacitive means for storing a capacitance in accordance with a difference between charges stored in said first and second capacitive means.

8. The difference detecting unit according to claim 7, wherein said integrator means further comprises equivalency means for connecting loads equivalent in capacitance to said first and second capacitive means and to sensor means.

9. A correlation operating circuit for receiving a plurality of signals through respective input terminals, and for producing a correlation of said signals, said correlation operating circuit comprising:
    comparison means for comparing said signals to determine which of said signals has a higher or lower level relative to each other; and
    integrator means for storing a difference of said plurality of signals in accordance with the determination by said comparison means, and for maintaining the levels of said plurality of output signals by connection with said input terminals.

10. The correlation operating circuit according to claim 9, wherein said plurality of signals are first and second analog electrical signals.

11. The correlation operating circuit according to claim 10, said integrator means comprising:
    a first capacitive means for storing a capacitance in accordance with said first analog electrical signal;
    a second capacitive means for storing a capacitance in accordance with said second analog electrical signal; and
    a third capacitive means for storing a capacitance in accordance with a difference between charges stored in said first and second capacitive means.

12. The correlation operating circuit according to claim 11, wherein said integrator means further comprises equivalency means for connecting loads equivalent in capacitance to said first and second capacitive means and to said input terminals.

13. An automatic focusing system, comprising:
    sensor means including first photo-electric conversion means for converting one of a pair of optical images of an object into an analog electrical signal with a plurality of picture elements, and second photo-electric conversion means for converting the other of said pair of optical images into an analog electrical signal with a plurality of picture elements, said sensor means reading said analog electrical signals provided by said photo-electric conversion means with a predetermined period for every picture element in such a manner that said analog electrical signals are shifted in phase from each other;
    comparison means for comparing said analog electrical signal corresponding to the one optical image and said analog electrical signal corresponding to the other optical image with each other which are outputted by said sensor means with a predetermined period, to determine which one of said analog electrical signals is larger or smaller in level; and
    switched capacitor integrator means in which, in each period output of said sensor means, a first capacitive element means is charged while a second capacitive element means is charged with the other, and by adding the charge of said first capacitive element means to the charge of said second capacitive element means in accordance with an output signal of said comparison means a charge is stored in a third capacitive element means which corresponds to a value which is obtained by subtracting said analog electrical signal lower in level from said analog electrical signal higher in level for every picture element, and by storing said charge in said third capacitive element means over a plurality of periods charges are integrated which correspond to the sum of charges each corresponding to said value which is obtained by subtracting said analog electrical signal lower in level from said analog electrical signal higher in level,
wherein
said switched capacitor integrator means comprises switching means for connecting, when the charges of said first and second capacitive element means are added to each other in each period, loads equivalent in capacitance to said first and second capacitive element means to the output of said sensor means.

14. An automatic focusing system according to claim 13, further comprising means for changing the capacitance of said third capacitive element in said switched capacitor integrator.

* * * * *